United States Patent [19]
Davidson et al.

[11] Patent Number: 5,819,093
[45] Date of Patent: Oct. 6, 1998

[54] SYSTEM AND METHOD FOR A DISTRIBUTED DEBUGGER FOR DEBUGGING DISTRIBUTED APPLICATION PROGRAMS

[75] Inventors: Andrew E. Davidson, Boulder Creek; Jon A. Masamitsu, Livermore, both of Calif.

[73] Assignee: Sun Microsystems, Inc., Mountain View, Calif.

[21] Appl. No.: 399,120

[22] Filed: Mar. 3, 1995

[51] Int. Cl.$^6$ .................................................. G06F 9/455
[52] U.S. Cl. .................... 395/704; 395/706; 395/183.01; 395/183.14; 364/269.91; 364/275.5
[58] Field of Search ..................... 395/650, 700, 395/704, 706, 183.01, 183.14; 364/275.5, 267.91

[56] References Cited

U.S. PATENT DOCUMENTS

| | | | |
|---|---|---|---|
| 4,589,068 | 5/1986 | Heinen, Jr. ............................ | 364/300 |
| 5,325,530 | 6/1994 | Mohrmann .............................. | 395/700 |
| 5,371,746 | 12/1994 | Yamashita et al. ........................ | 371/19 |
| 5,452,437 | 9/1995 | Richey et al. .............................. | 371/19 |

OTHER PUBLICATIONS

Tsai et al, "A Noninvasive Architecture To Monitor Real–Time Distributed Systems", IEEE Computer Magazine, vol. 23, Iss. 3, pp. 11–23, Mar. 1990.

Fernandez et al., "Ddbx–Lpp: a dynamic software tool for debugging asynchronous", Systems, Man, and Cybernetics, 1991 International Conference, IEEE/IEE Publications Ondisc.

"BSD Sockets", http://www/ecst/csuchico.edu/~chafey/prog/sockets/sinfo.1.html.

Frost, Jim "BSD Sockets: A Quick and Dirty Primer", http://www.ecst.csuchico.edu/~chafey/prog/sockets/sinfo2.html, Feb. 13, 1990.

"The Common Object Request Broker: Architecture and Specification", OMG Document Number 93.xxyy Revision 1.2 Draft 29 Dec. 1993, pp. 1–182.

SPARCworks manual entitled "Debugging a Program", Version 3.0.1 for Solaris, SunSoft, No. 801–7105–10, pp. iii–Index 302.

VHS Video tape entitled "Power Tools for Professional Developers", Inside the SunSoft Workshop, V–NTSC 94306–002.

*Primary Examiner*—Lucien U. Toplu
*Assistant Examiner*—Michael T. Richey
*Attorney, Agent, or Firm*—Hickman & Martine, LLP

[57] ABSTRACT

A system and method for providing a distributed debugger system for a distributed target computer application are disclosed wherein the programmer/developer of the application can be at one host machine and wherein the application being developed makes use of objects and object implementations which may be located on a different host machine which is unknown to the programmer/developer. The system and method provides solutions to problems which are encountered in trying to debug a new application which is associated with the use of objects in a widely distributed, object oriented, client-server system. In a distributed object environment, requests and replies are made through an Object Request Broker (ORB) that is aware of the locations and status of objects. One architecture which is suitable for implementing such an ORB is provided by the Common Object Request Broker Architecture (CORBA) specification. The distributed debugger system disclosed herein is designed to function in a CORBA compliant distributed system.

21 Claims, 15 Drawing Sheets

DbxWrapper Interfaces

```
enum DbxWrapperFailedReasons {
    FAILED_TO_START,
    FAILED_TO_ATTACH,
    ALREADY_BEING_DEBUGGED,
    PERMISION_DENIED
};

exception DbxWrapperFailed {
    DbxWrapperFailedReason reason;
}

Interface DbxWrapper {
    void SynchronizeDbxEngine();
    void Quit();
};

Inteface DbxWrapperFactory {

DbxWrapper Create(
        In object servant,      // object to be debugged
        In string path,         // path the dbx program
        In string dbxEngine,    // dbx program name
        In string display,      // the X display to connect to
        In string arguments     // contains toolTalk address
    ) raises(DbxWrapperFalled );

void DbxEngineAttached();
};
```

*Figure 15*

SYSTEM AND METHOD FOR A DISTRIBUTED DEBUGGER FOR DEBUGGING DISTRIBUTED APPLICATION PROGRAMS

BACKGROUND OF THE INVENTION

1. Field of the Invention

This invention relates to the fields of distributed computing systems, client-server computing and object oriented programming. More specifically, the invention is a method and apparatus for providing program developers and users the ability to debug target applications which may include programs or objects on distributed servers.

2. Background

It is essential that a computer application developer be able to debug the application he is creating. This becomes an exceedingly difficult problem in an object-oriented, distributed processor environment. Such modern environments include applications which invoke objects developed by persons other than the application developer and may include implementations of the objects which are running on a processor remote from and unknown to the application developer. Nevertheless the application developer must have a way to debug the portions of the application that might reside on such remote and unknown processors.

For example, a distributed application is an application that comes in two or more parts. Those parts are often referred to as a client and its servers. Distributed applications have been in existence for many years and for just as many years program application developers have had the problem of debugging distributed applications. The typical method for debugging a distributed program is to start the client under a debugger and debug the client until one gets to a function that is in a server. If the developer is lucky, the server is already running on a known host. The developer then goes to the server host, identifies the server process, attachs a debugger to it, and continues the debugging session. If the server is not running yet, the developer must figure out how to get the server running and hope that whatever he did does not obscure the bug he/she is hunting. Once the server has been started the developer again attachs a debugger to it. Or the developer has to figure out how to interpose on the startup of the server so that he/she can attach a debugger to the server before anything interesting happens. This method is error prone, laborious, often confusing and tedious.

In an object oriented system, an object is a component comprising data and operations which can be invoked to manipulate the data. The operations (also called "methods") are invoked on the object by sending calls to the object. Each object has an object type that defines the operations that can be performed on objects of that type. One object type may inherit the object operations defined and implemented for other object types. For further description of object oriented design and programming techniques see "Object-oriented Software Construction" by Bertrand Meyer, Prentice-Hall 1988.

In client-server computing, typically there is a set of computers that can communicate with one another through a network connecting the computers. Some of these computers act as providers of services or functionality to other computers. The providers of a service or functionality are known as "servers", and the consumers of the service or functionality are called "clients". The client-server model also generalizes to the case where distinct programs running on the same computer are communicating with one another through some protected mechanism and are acting as providers and consumers of functionality.

In object oriented distributed systems based upon the client-server model, there exist servers that provide object oriented interfaces to their clients. These servers support objects consisting of data and the associated software for manipulating the data according to the operations permitted by this type of object. Clients may obtain access to these objects and may execute calls on them by transmitting the calls to the server. At the server these calls are executed via the software associated with the object. The results of these calls are then transmitted back to the client.

Another fundamental problem with prior art debuggers arises when one is faced with debugging an application which is implemented in a modern day distributed object system. Consider a Distributed Objects system of the type generally specified by the Object Management Group ("OMG"). OMG is a collection of over 500 companies which have agreed to certain specifications and protocols for such a distributed object system. The basic specification for this system is contained in the OMG Document Number 93.xx.yy Revision 1.2 dated 29 Dec. 1993 titled "The Common Object Request Broker: Architecture and Specification" (otherwise referred to as CORBA) which is incorporated herein by reference. Such CORBA compliant systems provide for building applications with pre-existing objects. Such applications can request the creation of an object and perform operations on that object. The creation and operations on objects are performed by servers for those objects. If such an application wants to create an object, it transparently utilizes a locator mechanism which finds a server known as a "factory" for that object. Similarly if such an application has a pre-existing object, it transparently utilizes a locator mechanism to find a server that can perform operations on that object.

In such CORBA compliant systems there is a considerable amount of mechanism behind each object that allows the application programmer to use objects without knowledge of where the servers for the objects run. In the special circumstance where the developer of the client is also the developer of the server, arrangements can be made such that the programmer will know where the servers will run and what their names are. In general, however, the CORBA compliant system applications developer will be unable to locate the servers associated with his objects. Thus there exists a need to support debugging of objects used by applications regardless of whether the object is located in the same or remote process and regardless of where the object is. Moreover this debugging procedure should preferably create a "single process" illusion to the developer to allow the debugging of a large distributed application using a familiar debugging paradigm.

A major shortcoming of certain prior art debuggers is that they require a large overhead of supporting data and processes, usually comprising additional data generated by related compilers. Therefore a preferred embodiment for a remote debugger requires that object implementors should not have to do anything special to make their objects "debuggable" other than compile their servers so that symbolic information is generated. (In C and C++using the –g compiler option.). However no additional behavioral or data abstractions on either servers or servant should be required lest the related overhead dominate the size and performance of fine grained objects. Similarly, another limitation of the prior art debugging systems is that they are linked to a specific type of target application and/or a specific compiler language. It is desired to have a distributed debugger be able to debug applications independent of the implementing language. That is, the preferred distributed debugger should not require any assumptions about the kinds of servers and objects it may operate on or operate with. The CORBA specification describes a variety of "Object Adapters" which may be used to service different kinds of object implementations. The desired distributed debugger should operate in an "Object Adaptor" independent manner if it indeed need not make any assumptions about the kinds of servers or objects it can operate with. Furthermore it is desired to have a distributed debugger that can ignore any boiler-plate code which the implementation of the CORBA compliant system might use to facilitate the operation of the system. "Boiler-plate" code refers to any non-programmer-generated code produced by the development environment and which is unknown to the developer. The distributed debugger should allow the developer to debug his system at the same functional level of abstraction at which they implemented the system.

The distributed debugger of the present invention, designated the "doeDebugger", provides an apparatus and method for accomplishing distributed debugging in a seamless, low-overhead, unencumbered manner, thereby permitting a developer to debug a distributed object oriented application with the illusion that he is debugging a "single process" application.

SUMMARY OF THE INVENTION

An apparatus and a method are disclosed whereby a client application can use a debugger on a local host, while at the same time being able to seamlessly debug an application that involves objects and object implementations that may be running on unknown remote host computers.

A distributed bebugger system is disclosed for debugging a distributed target application system which may reside partly on a local host computer and partly on one or more remote host computers, the distributed debugger system having a debugger-GUI and one or more dbx engines which may reside on the local or a remote host computer, and a communications mechanism for use by the dbx engines and the debugger-GUI to talk to each other.

A further aspect of the invention claimed includes a distributed debugger system for debugging a distributed target application system which may reside partly on a local host computer and partly on one or more remote host computers, the distributed debugger system having a debugger-GUI and one or more dbx engines which may reside on the local or a remote host computer, and a communications mechanism for use by the dbx engines and the debugger-GUI to talk to each other, and having a dbxWrapperFactory mechanism for use by the debugger-GUI to create new dbx engines in remote host computers as necessary to provide the desired remote debugging support.

The present invention also relates to apparatus for performing these operations. This apparatus may be specially constructed for the required purposes or it may comprise a general purpose computer as selectively activated or reconfigured by a computer program stored in the computer. The operations presented herein are not inherently related to a particular computer or other apparatus. In particular, various general purpose machines may be used with programs written in accordance with the teachings herein, or it may prove more convenient to construct more specialized apparatus to perform the required method steps. The required structure for a variety of these machines will appear from the description given.

Another aspect of the present invention claimed includes a dbx engine for use in a distributed debugger system in debugging a distributed target application system which resides on a local host computer and on one or more remote host computer units, the dbx engine comprising a dstep mechanism for ignoring non-programmer generated code, a testing mechanism for identifying such non-programmer generated code (also called IDL generated code), a mechanism for setting remote breakpoints in sections of the target application system, a GetImplementation mechanism (also called a "find server" mechanism) for identifying the host ID and process ID (pid) of a server which implements a called object, and a multiple dbx engine synchronizer mechanism for permitting dbx engines to communicate with each other.

Also claimed in this application are methods for producing a dbx engine having the characteristics described above, as well as methods for producing a distributed debugger system as described above.

DESCRIPTION OF THE DRAWINGS

The objects, features and advantages of the system of the present invention will be apparent from the following description in which:

FIG. 15 illustrates a typical interface for a dbx Wrapper.

NOTATIONS AND NOMENCLATURE

Figure 1:
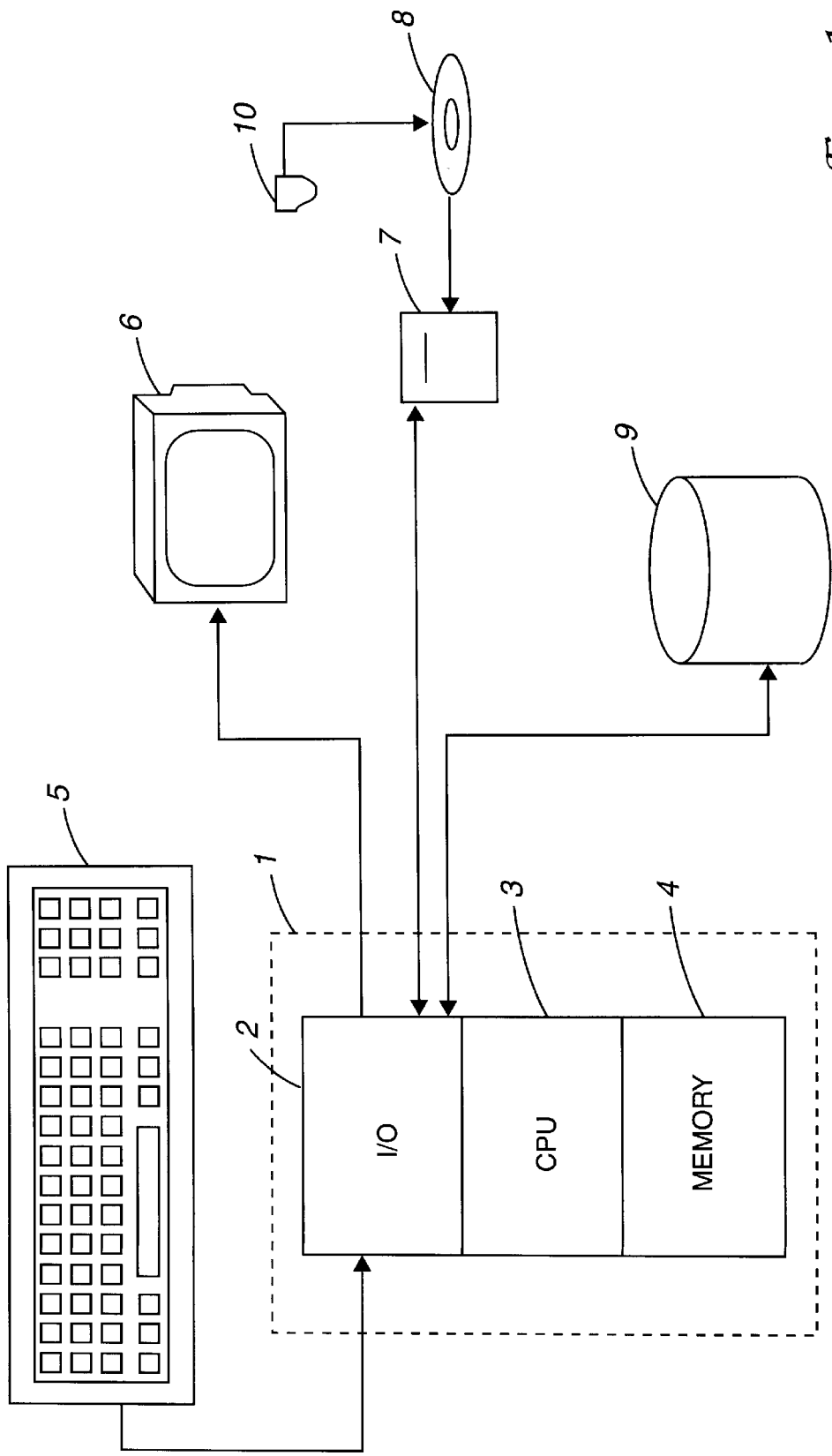
FIG. 1 illustrates a general purpose computer and related units.

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or similar devices.

The present invention also relates to apparatus for performing these operations. This apparatus may be specially constructed for the required purposes or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

DESCRIPTION OF THE PREFERRED EMBODIMENT

The following disclosure describes a system and method for debugging a distributed computer application wherein the programmer/developer of the application is at one host machine and wherein the application being developed makes use of objects and object implementations which may be located on a different host machine which is unknown to the programmer/developer. The system and method provides solutions to problems which are encountered in trying to debug a new application which is associated with the use of objects in a widely distributed, object oriented, client-server system. Distributed objects can be object clients or object servers depending on whether they are sending requests to other objects or replying to requests from clients. In a distributed object environment, requests and replies are made through an Object Request Broker (ORB) that is aware of the locations and status of objects. One architecture which is suitable for implementing such an ORB is provided by the Common Object Request Broker Architecture (CORBA) specification. The implementation described, while it may be used in any relevant context, is an extension to the Distributed Object Environment ("DOE") system of Sun Microsystems, Inc. DOE is Sun's present implementation of the CORBA architecture. However, no specific knowledge of the DOE system is required by those skilled in these arts to understand and implement the process and system described in this disclosure.

The present invention discloses systems and methods for creating and using a doeDebugger which can permit a programmer/developer to ignore the fact that an object invoked by his application may be implemented remotely, and does not require him to do anything special because of a remote implementation, and which does not incur an inordinate overhead load, which is secure and which allows the programmer/developer to debug his system at the same functional level of abstraction at which he implemented the system. Alternate implementations would also provide some language independence.

I. DEFINITIONS

As used herein, the term "distributed object" or "object" refers to an encapsulated package of code and data that can be manipulated by operations through a defined interface that is associated with an object. Thus, distributed objects will be seen by those skilled in the art as including the basic properties that define traditional programming objects. However, distributed objects differ from traditional programming objects by the inclusion of two important features. First, distributed objects are multilingual. The interfaces of distributed objects are defined using an interface definition language that can be mapped to a variety of different programming languages. One such interface definition language is OMG IDL. Second, distributed objects are location-independent, i.e., distributed objects can be located anywhere in a network. This contrasts sharply with traditional programming objects which typically exist in a single address space: the address space of the "client". Distributed objects can be object clients or object servers, depending upon whether they are sending requests to other objects or replying to requests from other objects. Requests and replies are made through an Object Request Broker (ORB) that is aware of the locations and status of the objects.

A "distributed object system" or "distributed object operating environment" refers to a system comprising distributed objects that communicate through an ORB.

An "object reference" or "objref" is a data structure (it may be a traditional programming language object) that contains a pointer to another object. The creation and definition of object references will be familiar to those skilled in the art.

A "client" as defined herein refers to an entity that sends a request to an object. In this model, the object provides a service and is referred to as a "server object" or a "target object" or an "object implementation." Thus, clients invoke operations, or implementations, from servers. In some cases, clients are themselves objects. In a distributed object environment, clients need not have knowledge of the implementation programming language, nor does the implementation have to have knowledge of the client's programming language due to the requirement of multilingual character of such objects. Clients and servers in distributed object operating environments need only communicate in terms of the interface definition language. As noted above, the request by the client to the server, and the server's reply to the client, is handled by the ORB. It should be pointed out that the client and server can exist within the same process, on the same host computer, or on two different host computers.

An "object interface" is a specification of the operations, attributes, and exceptions that an object provides. Preferably, object interfaces for distributed objects are written using an authorized Interface Definition Language (IDL). As noted above, objects perform transactions through their interfaces. The use of interfaces therefore eliminates the need of clients to be aware of the programming languages used to define the methods and data of the objects in the transaction.

To "marshal" a packet of information is to prepare this information for transfer either through a shared memory communications channel or over a network communications line. This often means organizing the data in a particular format in accordance with the communications protocol being used.

To "unmarshal" a packet of information is to essentially reverse the marshaling procedure and produce data in a format which is meaningful in the appropriate environment. "ToolTalk" is a communications system developed and supplied by SunSoft, a subsidiary of Sun Microsystems, Inc. "ToolTalk" provides a communications service that delivers messages created by one application to others who have asked to receive the messages. "ToolTalk" enables independent applications to communicate with other applications without having direct knowledge of each other. A sender can address a "ToolTalk" message to a particular process, to any interested process, to an object, or to an object type. "ToolTalk" is described in depth in the SunSoft Press/PTR Prentice Hall book titled "*The ToolTalk Service: An Inter-Operability Solution*. (ISBN 013-088717-X).

II. OPERATING ENVIRONMENT

Figure 2:
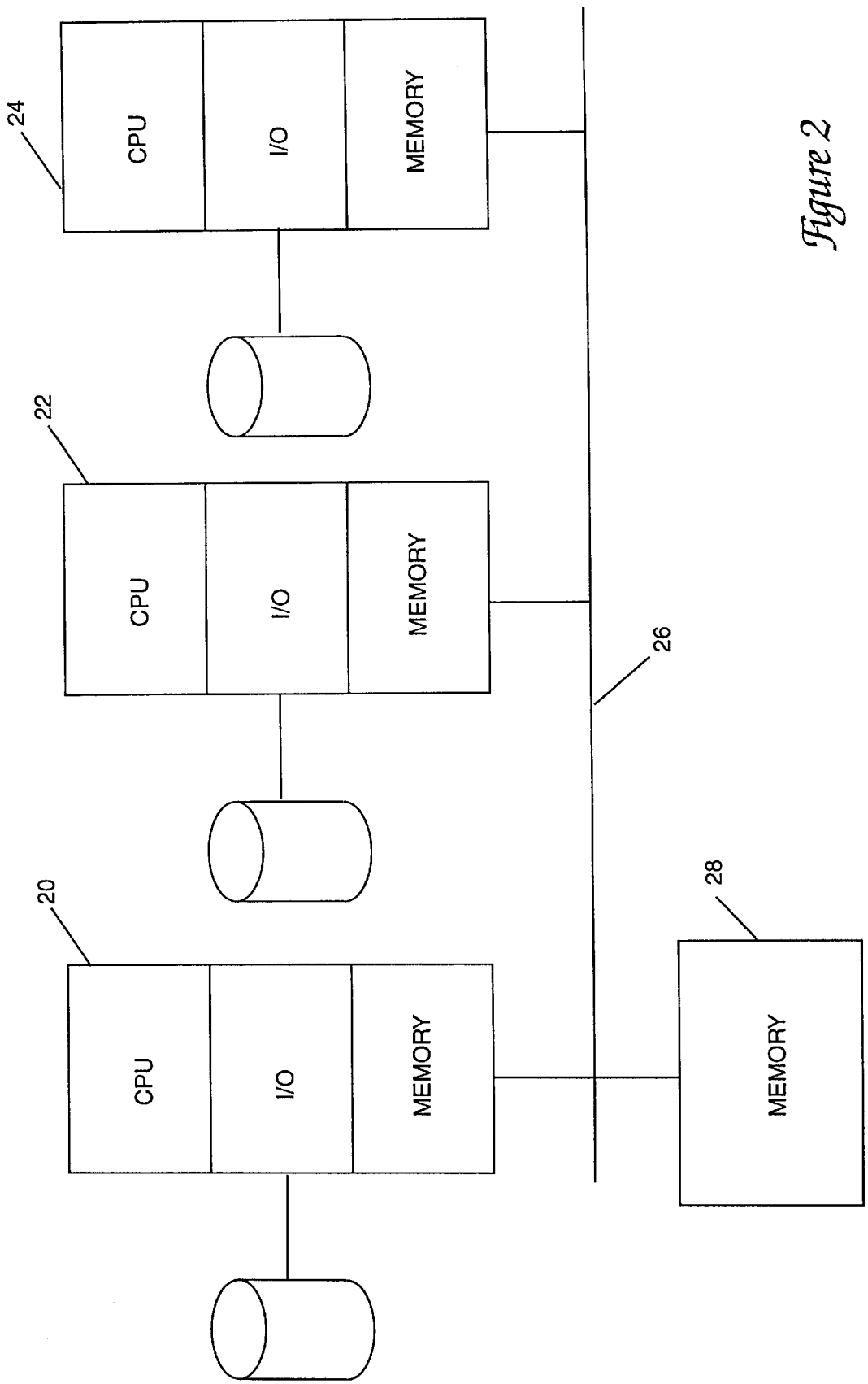
FIG. 2 illustrates a distributed computer system.
Figure 3:
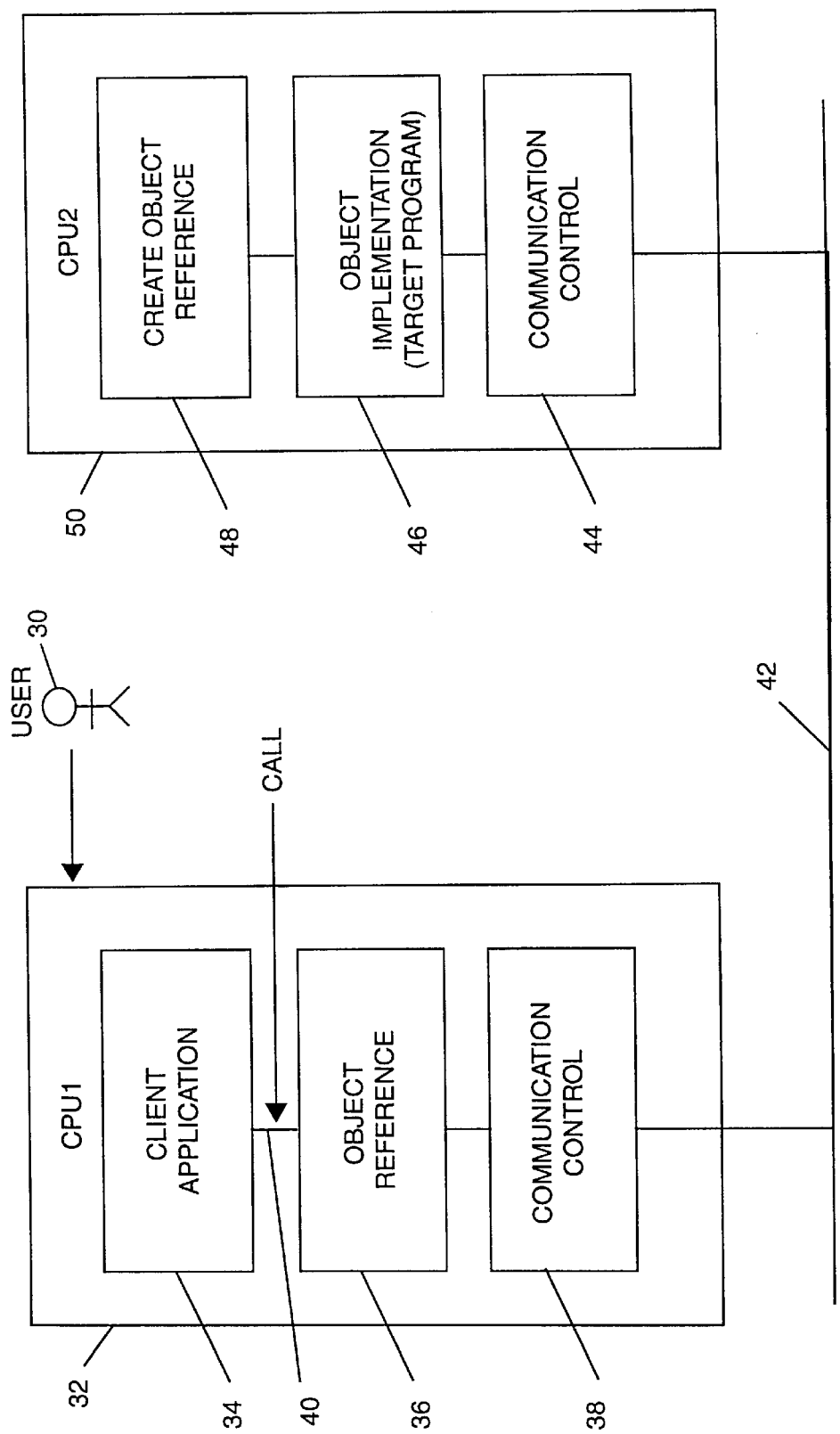
FIG. 3 illustrates a client-server system configuration with multiple machines, and illustrating the relationship of the user, client application, object reference, object implementation and create object reference program.
Figure 4:
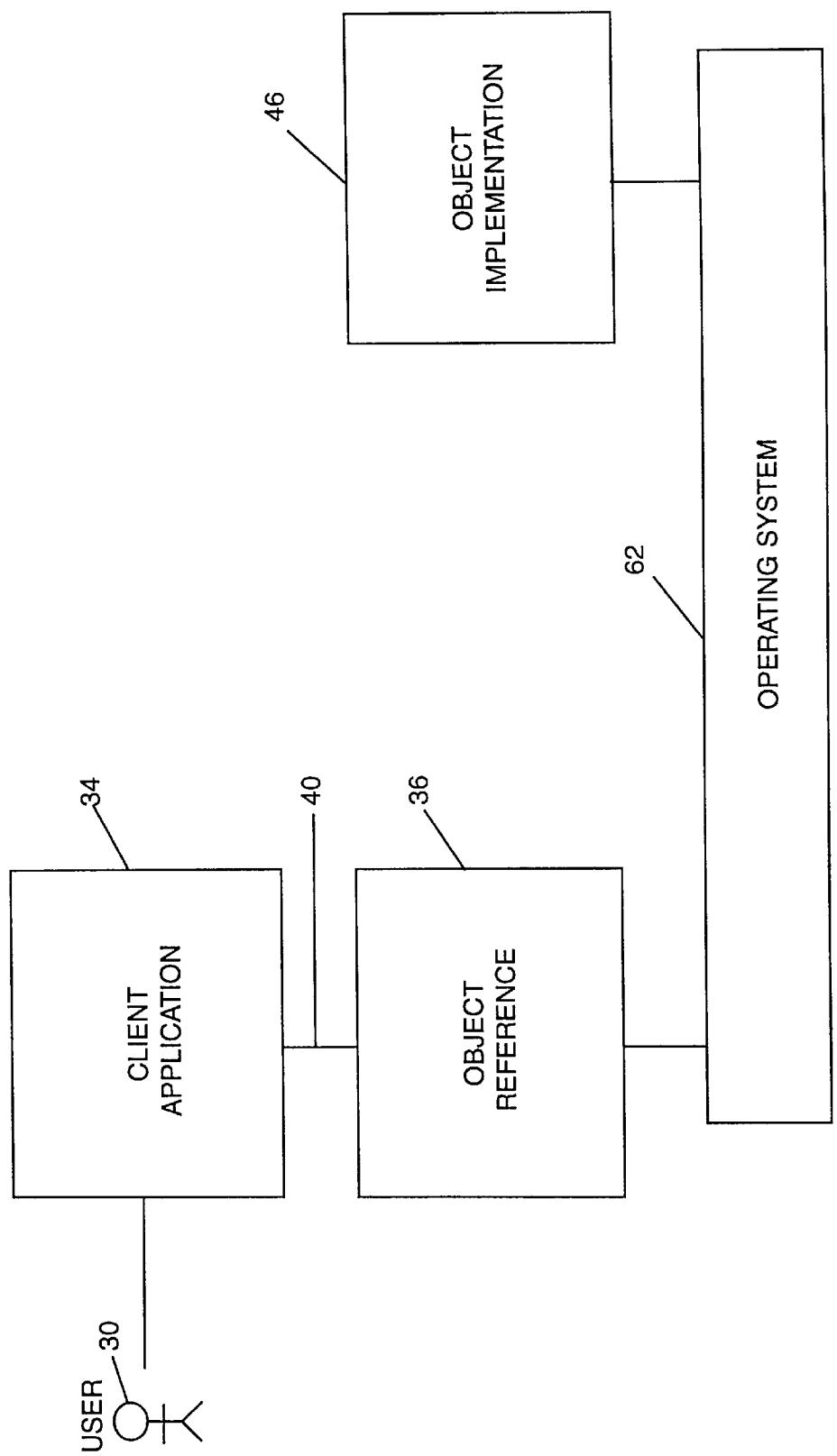
FIG. 4 illustrates a client-server configuration using a single machine.

The environment in which the present invention is used encompasses the general distributed computing system, wherein general purpose computers, workstations, or personal computers are connected via communication links of various types, in a client-server arrangement, wherein programs and data, many in the form of objects, are made available by various members of the system for execution and access by other members of the system. Some of the elements of a general purpose workstation computer are shown in FIG. 1, wherein a processor 1 is shown, having an Input/output ("I/O") section 2, a central processing unit ("CPU") 3 and a memory section 4. The I/O section 2 is connected to a keyboard 5, a display unit 6, a disk storage unit 9 and a CD-ROM drive unit 7. The CD-ROM unit 7 can read a CD-ROM medium 8 which typically contains programs 10 and data. FIG. 2 illustrates a typical multi-processor distributed computer system wherein independent computers 20, 22 and 24 are connected to each other and possibly to a shared memory unit 28 via a communication link 26 FIG. 3 illustrates a typical object oriented, client server arrangement, wherein a user 30 can initiate a client application 34 on a first computer 32. The client application 34 places a call 40 on an object reference 36 which points to an implementation of the object ( also referred to as the "target object") 46 on a second computer (the server) 50. The call 40 is passed to the communication control mechanism 38 which sends the call to the server 50 on which the object implementation 46 is located. This object implementation mechanism 46 originally creates the object reference 36 and makes it available to users. Upon completion of processing the call, the object implementation 46 will return a message or the results of a desired operation via the communication link 42 to the originating client application 34. This client-server model may also function in a single processor unit wherein the communications mechanism functions are performed by the operating system (62 in FIG. 4).

III. THE DISTRIBUTED DEBUGGER—HOW TO MAKE IT

Figure 5:
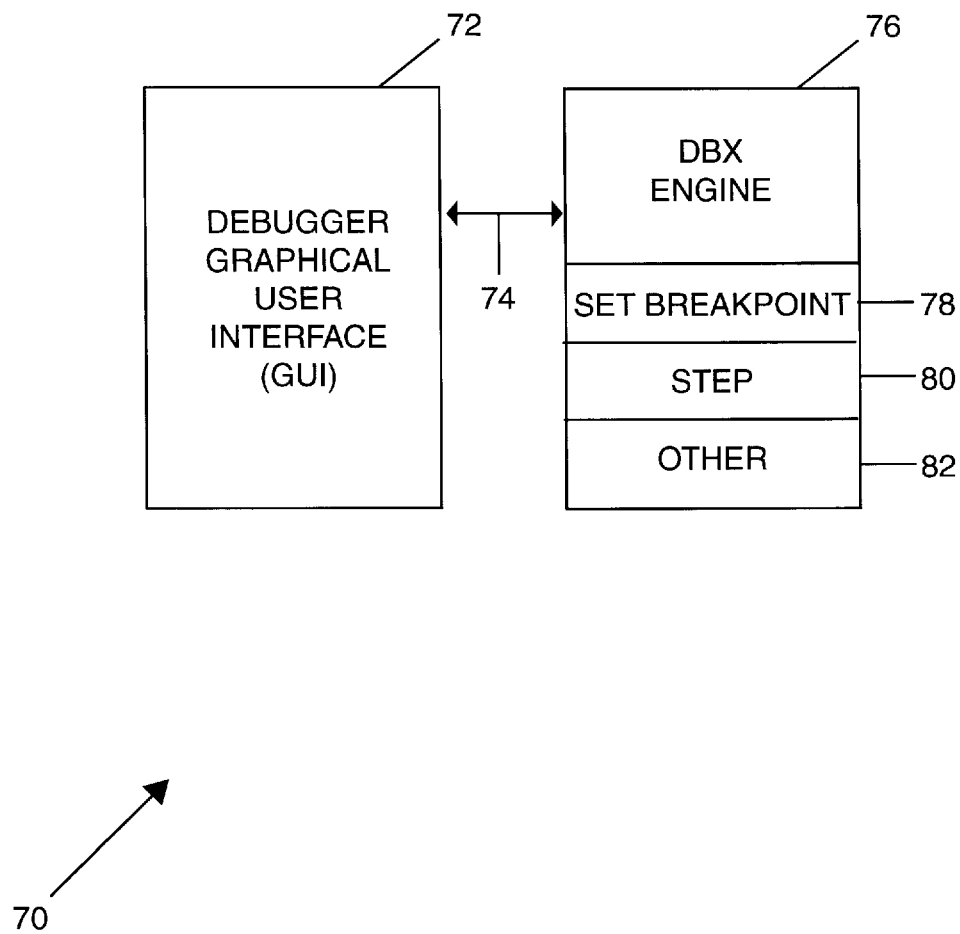
FIG. 5 illustrates the SPARCworks debugger.

Referring now to FIG. 5, The SPARCworks debugger system is depicted. The SPARCworks debugger (hereinafter the "Debugger") is an integrated component of the SPARC-works toolset produced by Sun Microsystems, Inc. which includes an Analyzer, a dbx engine, a FileMerge tool, a Maketool, a Manager and a SourceBrowser. The Debugger is more fully described in the publication titled "*Debugging a Program*" published by SunSoft as Part No. 801-7105-10 dated August 1994 and which is fully incorporated herein by reference.

Referring now to FIG. 5 the Debugger comprises a sophisticated window-based tool 72 (the Debugger Graphical User Interface (GUI)) that interfaces with the dbx engine 76. The dbx engine 76 is an interactive, line-oriented, source-level, symbolic debugger. The dbx engine 76 permits one to determine where a target program crashed, view the values of variables and expressions, set breakpoints 78 in the code, and run and trace a target program. During program execution, the dbx engine 76 obtains detailed information about target program behavior and supplies the Debugger GUI 72 with this information via a ToolTalk communications protocol 74. The dbx engine 76 relies on debugging information a compiler generates using the compiler option –g to inspect the state of the target process. By default on Solaris 2.x, the current Sun Microsystems, Inc. operating system environment, debugging information for each program module is stored in the module's .o file. In the preferred embodiment on Solaris 2.x, the dbx engine 76 reads in the information for each module as it is needed. In addition to the "set breakpoint" 78 capability, the dbx engine 76 has a "single step" 80 capability as well as many other 82 features which are described in more detail in the above reference publication "debugging a Program." The "step" 80 feature allows the programmer/developer to single-step through target program code one line at a time at either the source or machine-language level; step "over" or "into" function calls; step "up" and "out" of a function call arriving at the line of the calling function line (but after the call). There are three type of breakpoint 78 commands;

(1) stop type breakpoints—If the target program arrives at a breakpoint created with a stop command, the program halts and optionally issues one or more debugging commands. Another debugging command must be issued in order to resume the target program.;

(2) when type breakpoints—the target program halts and the dbx engine issues one or more debugging commands and then the target program continues.; and (3) trace type breakpoints—the target program halts and an event-specific trace information line is emitted, and then the program continues.

Figure 6:
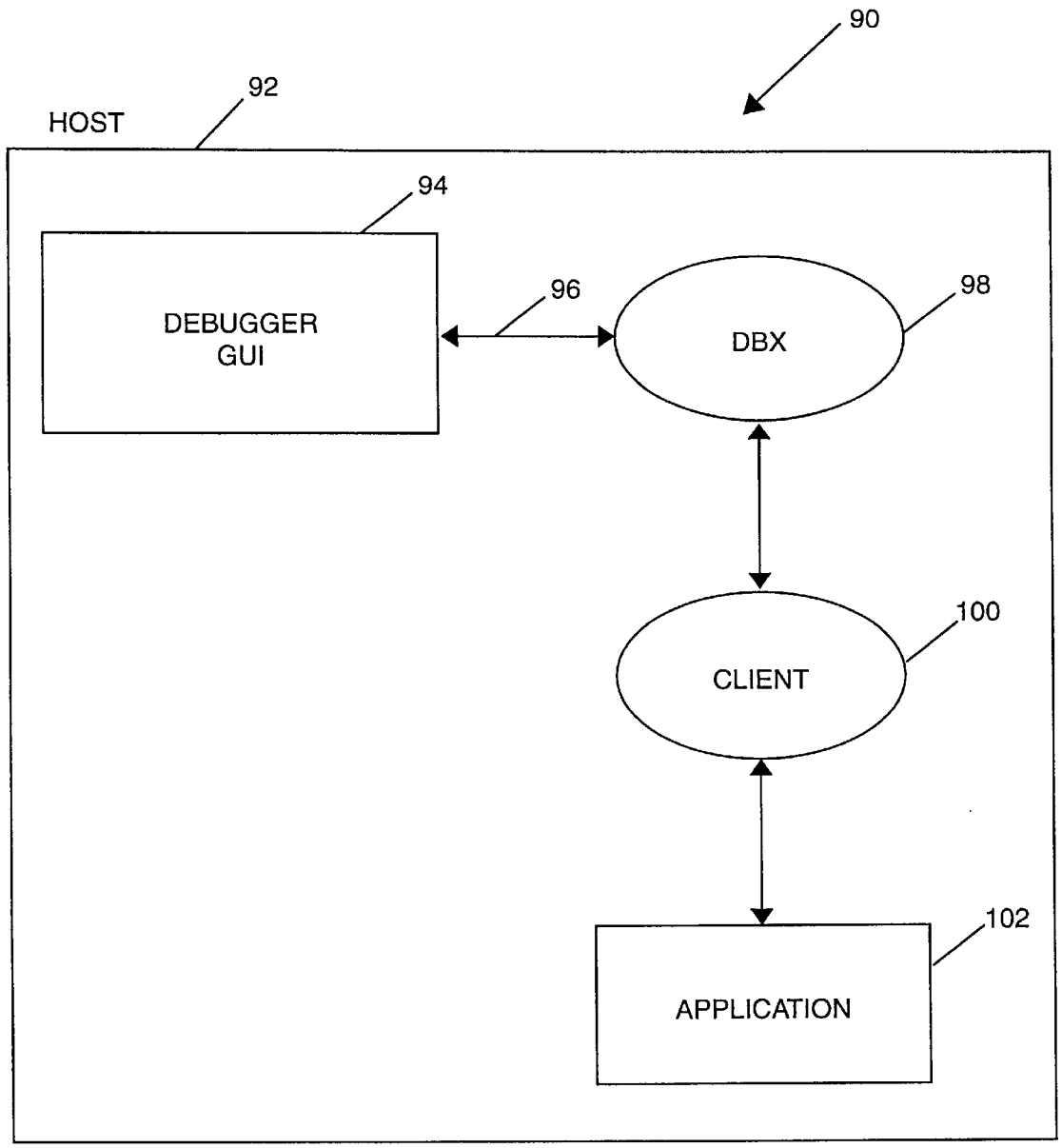
FIG. 6 illustrates the relationship between a client application, an object reference and the SPARCworks debugger.
Figure 7:
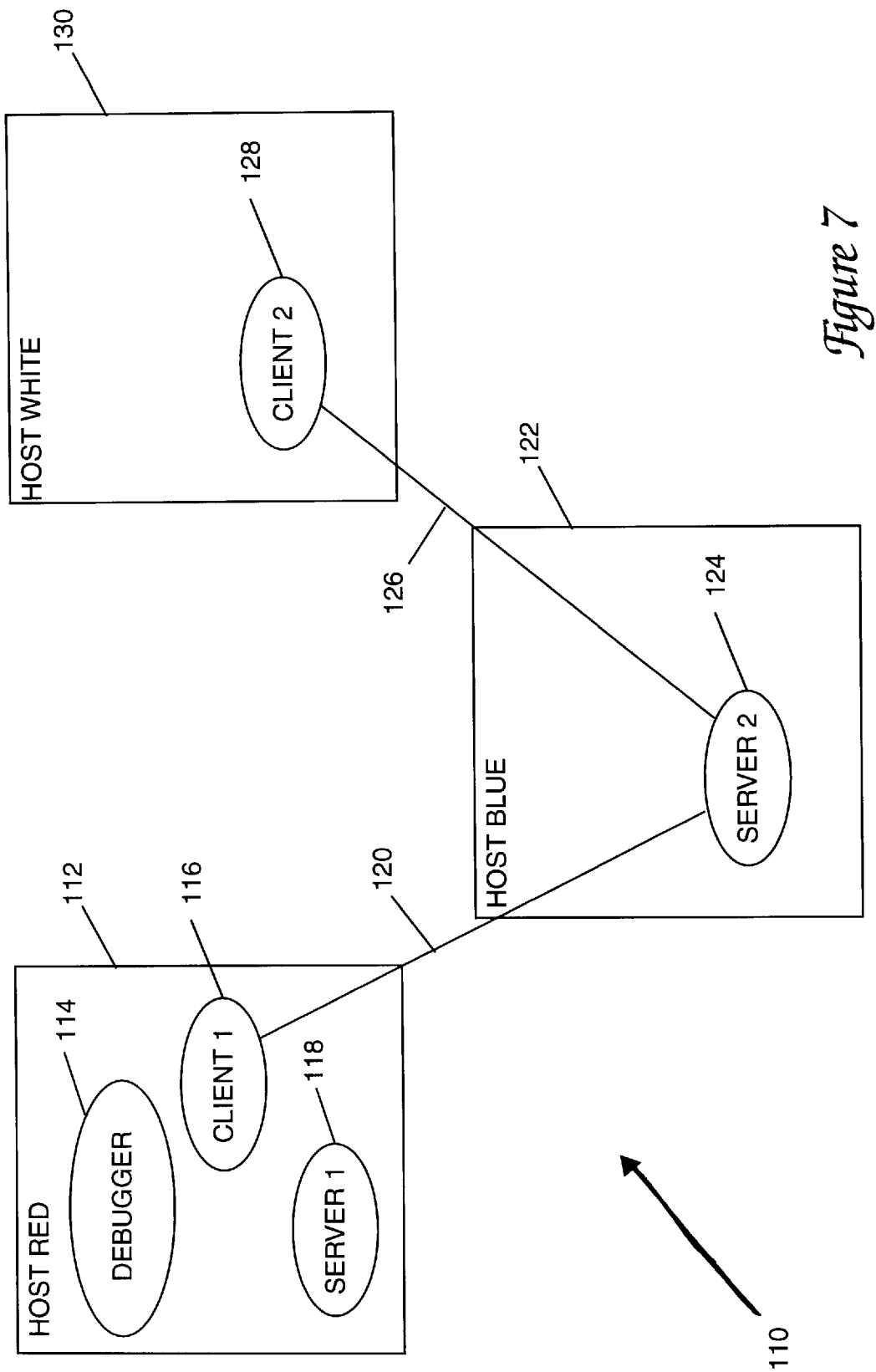
FIG. 7 illustrates a exemplary Distributed Object Environment (DOE) client application which requires access to multiple servers.

In a non-distributed system, a typical configuration of the Debugger is shown in FIG. 6. Therein a host machine 92 is shown containing the debugger GUI 94 connected to a dbx engine 98 by a ToolTalk communications link 96, with the dbx engine 98 linked to a client (target program) 100 which is further connected to additional target program application code (server) 102. In a distributed system the programmer/developer is faced with one wherein the situation is more like the one shown in FIG. 7. FIG. 7 shows multiple clients with multiple servers on multiple hosts. A programmer/developer using the Debugger 114 on the red host 112 to debug client 1 116 may find that the client 1 116 performs an operation on an object which can be performed by the server 118 on the red host 112 or by the server 124 on the blue host 122 and the programmer as the developer of client 1 116 does not know which server will be used for the execution of a call. In addition, whichever server is used by client 1 116 may also be used by client 2 128 on the white host 130. In a CORBA compliant distributed system such as DOE (the preferred embodiment of the present invention) there is a considerable amount of mechanism behind each object that allows the application programmer to use objects without knowledge of where the servers for the objects run. This seriously hampers the debugging of distributed applications under such circumstances. Furthermore all DOE servers are multithreaded servers, in which it is possible that the server will be servicing multiple requests from different clients simultaneously. Accordingly, the doeDebugger of the present invention is a solution to many of the debugging problems created by the DOE distributed environment.

Figure 8:
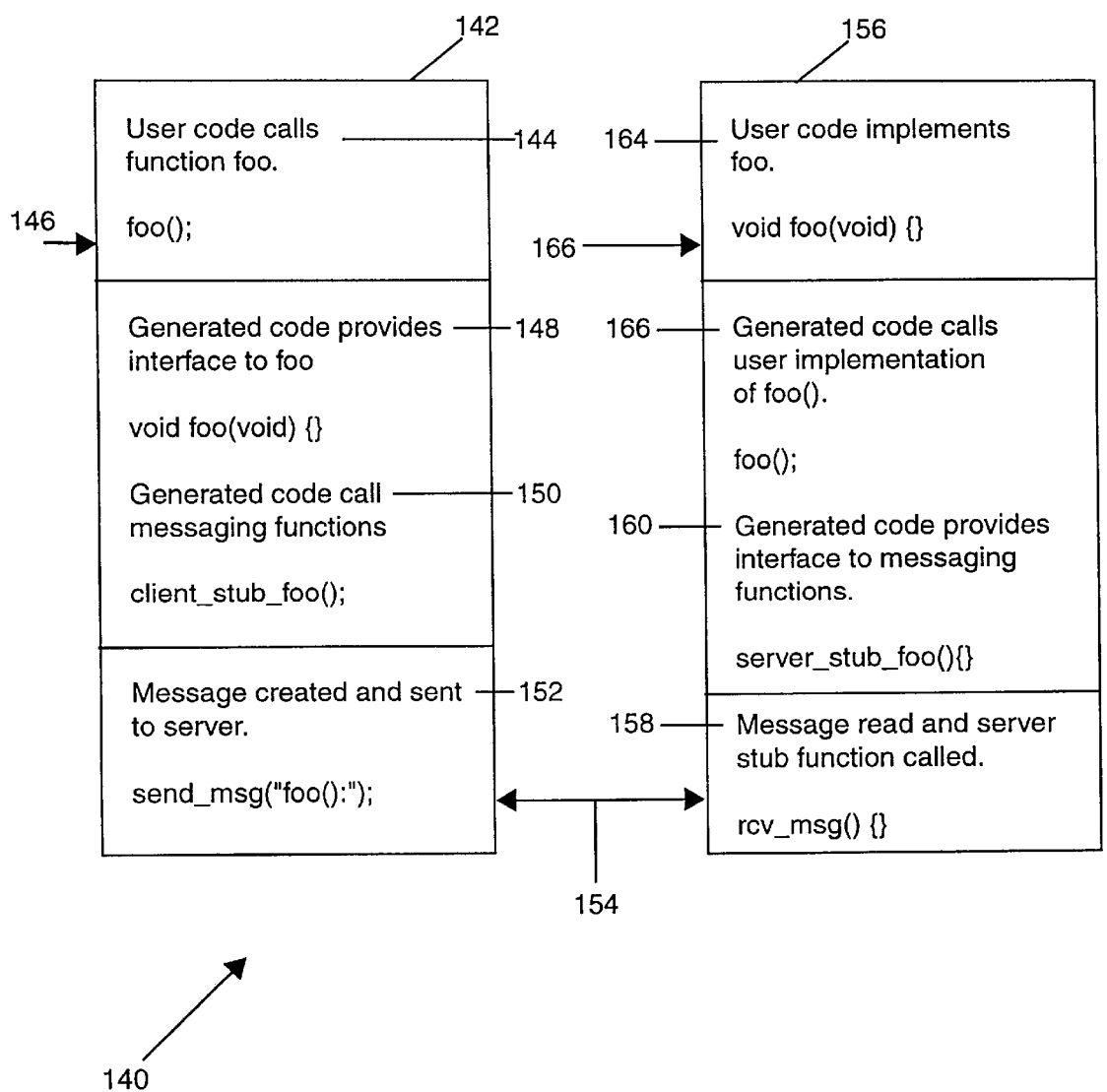
FIG. 8 illustrates the division between user code and underlying DOE mechanisms in a DOE client or server.

Before describing the modifications to the Debugger necessary to create the doeDebugger of the present invention, it is helpful to look briefly at the boiler plate mechanism code used by DOE to permit objects to communicate with each other in a CORBA compliant environment. Referring to FIG. 8 a view of the division between used code and underlying DOE mechanism is shown.

In FIG. 8, on a local host 142, User code calls a function, for example function "foo" 144. The DOE system provides for the generated code which provides the interface to function foo 148 and the generated code 148 calls messaging functions 150 to create the appropriate messages and send them to the server 152. These messages 154 arrive at an appropriate host 156 and are received by the server side message system 158 which passes the messages to a server side stub which is generated code by the Doe system 160 which then calls the implementation code of the function foo 162 and the user code of the implementation of the function processes the call 164. The applications programmer writes the code 144 which utilizes objects provided by doe servers. The application programmer defines the interfaces to the objects using the Interface Definition Language (IDL). IDL is compiled into client side and server side libraries that enable the operation on a object in the client to be performed in the server. The client side library consists of stub functions 148, 150 that convert an operation into a request 154 to a server. The server side libraries 160, 162 convert a request from a client to a call to a user provided function 164 that implements the operation.

For example in FIG. 8, the user has defined a function foo in IDL. The IDL compiler generates a stub function foo 148, 150 which causes a message to be created 152 that is sent to the server. On the server side, the IDL generated code 160, 162 takes the message from the client and converts it into a call to the function foo 164 that is provided by the programmer that implements the functionality of foo. All of this underlying code 148, 150, 152, 158, 160 and 162 is code that a programmer/developer does not want to debug and does not want the debugger to look at in a normal debug session. Consequently it is desired to allow a distributed debugging session to ignore all of this underlying code as far as the programmer/developer is concerned.

Figure 9:
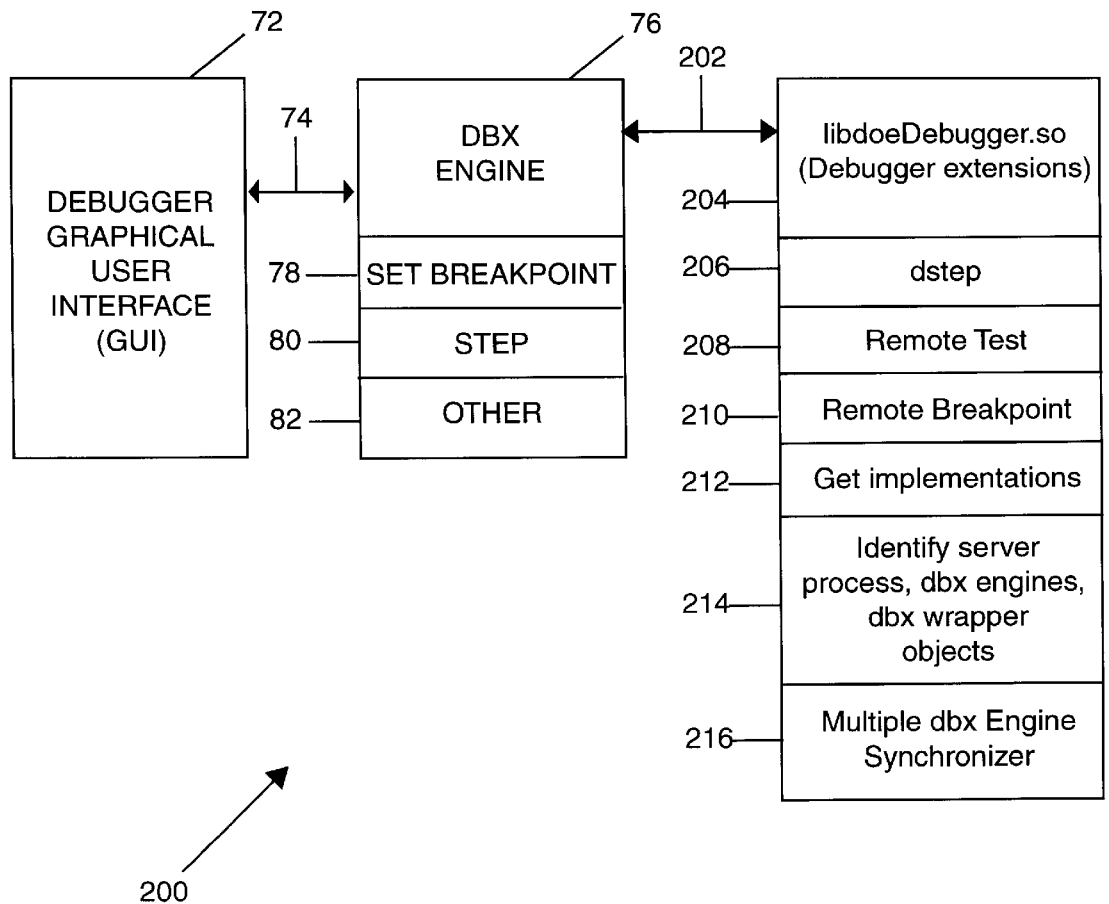
FIG. 9 illustrates a doe Debugger configuration.

FIG. 9 depicts the modifications and extensions required to convert the SPARCworks Debugger into the doeDebugger which is the present invention. The actual extensions are packaged in a shared library "libdoeDebugger.so" 204. The fundamental extensions required include the following:

a "dstep" command 206
a "remote surrogate code test" mechanism 208
a "Remote Breakpoint" setting mechanism 210
a "GetImplementation" mechanism 212
an "IdentifyRemoteFunction" mechanism 214
a "multiple dbx engine synchronizer" mechanism 216.

In addition to these extensions, the modifications to the Debugger-Gui and the dbx engine to support the doeDebugger operation included:

communications capability for one dbx engine to communicate to another dbx engine;
ability in the debugger-GUI to focus it on a particular dbx engine; and
the ability to get a list of all active dbx engines from the debugger-GUI.

The preferred embodiment of these modifications will now be described in general but those skilled in these arts will recognize that these capabilities and features may be implemented in many forms including some hardware mechanisms and devices for the portions that are most appropriate.

The "dstep" command will be used by the programmer/developer to seamlessly step into the implementation of a given function, regardless of where in the distributed system the function's implementation actually resides. "dstep" works by first issuing a normal dbx "step" command. The standard "step" command continues the execution of the process being debugged (the debugee) from the current source line to the next source line of the debuggee. When the current line is at the point of invocation of a function, the next source line is the first source line in the function being called. In order to extend the semantics of the step command to debugging of distributed applications, when the extended step enters a function such as foo on the client in FIG. 8 (point A 146), execution should stop at the first line in the implementation of foo in the server (point B 166). The extended step command (which will be referred to as the "dstep" command) will operate as the standard step command except in the following two situations:

When the "dstep" command is executed on the invocation of a function that will result in a invocation in a server, the next source line will be the first line of the function invoked in the server; and When the "dstep" command is executed on the return from a function invoked in the server, the next source line will be the source line in the client after the function invocation that resulted in the remote invocation. In terms of the DOE clients, the "dstep" command starts its special functions when the user steps into the IDL generated code. In terms of the DOE servers, the "dstep" command starts its special function when the user returns through the IDL generated code.

It is also necessary to shut down the doeDebugger transparently. Since the user does not know what has been done to support the remote debugging, he/she should not be expected to undo it.

After the "dstep" command is executed, the doeDebugger tries to determine if the current function is "remote surrogate code". "Remote surrogate code" is that code responsible for causing the remote invocation of the IDL operation. (that is, items 148, 150 in FIG. 8). Currently in the DOE system all of the "remote surrogate code" is generated by the IDL compiler.

On the client side the doeDebugger needs to recognize that it is descending into the IDL generated code. In order to accomplish this, DOE named a variable used in the first layer of IDL generated code with a special name. The presence of this variable serves as the trigger to start the "dstep" functionality.

As would be expected, the name of the client side function being called is the same as the name of the server side function that implements that function. In the example in FIG. 8, this just means that the programmer calls function "foo" on the client side and expects to get the function "foo" that he/she wrote on the server side. A server may be servicing many clients and therefore there may be many invocations of that function "foo" occurring in the server. The invocation of interest in the server is identified by determining which thread in the server was servicing the function call of the client being debugged. Two functions (one on the client side and one on the server side) were added to the message passing layer in DOE to aid in the identification of the specific thread in the server.

To locate the server for an object, the "find server" function was added to a DOE base class, This performs the functionality called "GetImplementation". This function could be invoked on any DOE object and would return the host of the server and the process id (pid) of the server. The doeDebugger calls the "find server" function in the client. This is not a function that could be incorporated into the doeDebugger because it has to be part of the object that is being used by the client. If the server is not running at the time the "find server" function is called, the server is started.

As has been explained, the presence of a special variable is used as the "trigger" to signal that the "dstep" functionality should be invoked when stepping into a function. A similar "trigger" is not used for signalling when a "dstep" should return from a server for two reasons:

the trigger mechanism was not available for the return; and the return involved passing back through code that we already knew about (i.e., we had entered the server through this code) and one could use that knowledge to trigger the return.

When the server is first entered, we save the stack pointer of the function (called the return trigger) that directly calls the user's implementation of the function "foo" (an IDL generated function in FIG. 8). When checking for the return from the server, we check the stack pointer of the current function against the return trigger. If there is a match, we continue out of the server.

Figure 14:
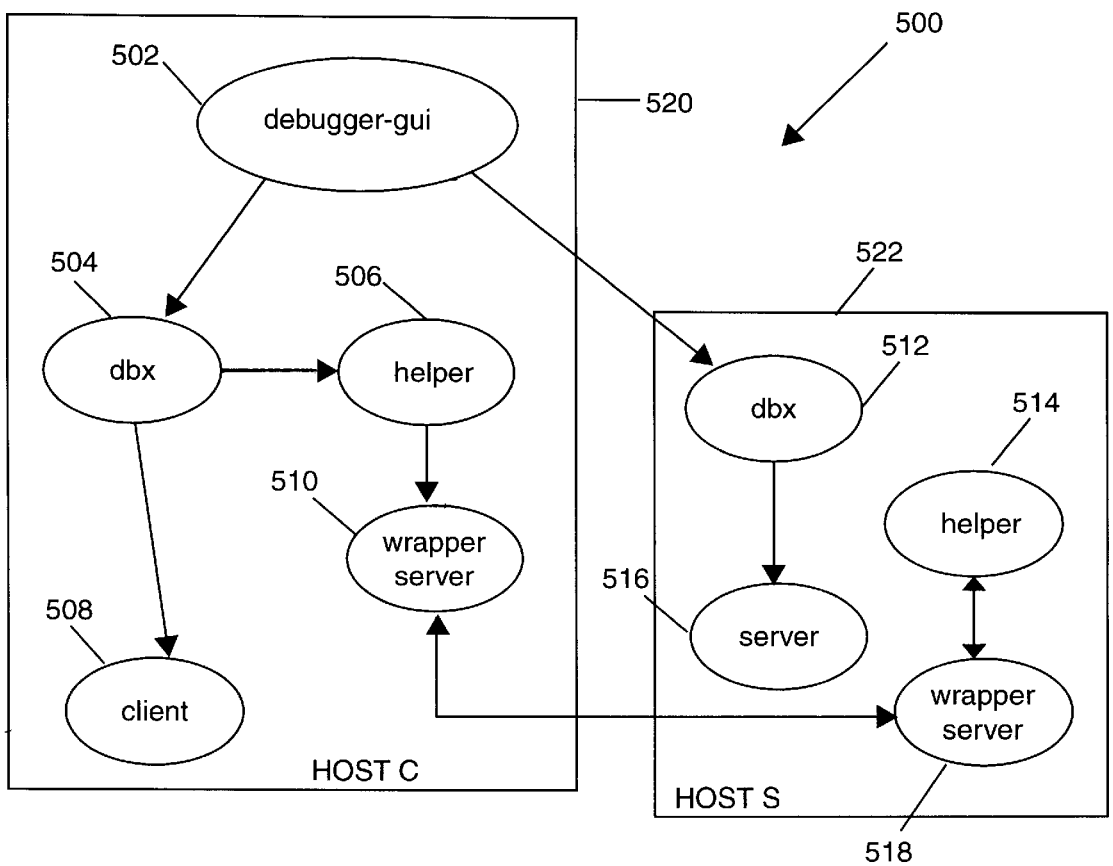
FIG. 14 illustrates the relationship between the doeDebugger, dbx engines, wrapper service and client application and server object implementation.

When the doeDebugger steps into a server for the first time, it must start a new dbx-engine on the server. This process is part of the "IdentifyRemote Function" process which was added as an extension to identify remote dbx engines, start/create a remote dbx engine using the facilities of a dbxWrapperFactory object. How this is done is now described with reference to FIG. 14. FIG. 14 depicts a local host 520 having a debugger-GUI 502, a dbx engine 504, a helper process 506, a client side wrapper server 510 and a client 508. Also shown are a remote host 522 containing a dbx engine 512, a helper process 514, a server side wrapper server 518 and the server (implementation of the called function) 516. Initialization of a new dbx engine including connection to the debugger-gui and attachment to the server is accomplished by the client side dbx engine 504 making a call to create a new dbx-engine.

The dbx engine 504 on the local host 520 creates the dbx engine 512 on the remote host 522 by means of a request to the wrapper server 510 on the local host 520 via the helper process 506 on the local host 520. The helper process 506 is a DOE application that communicates with the wrapper server 510. It is necessary because dbx engines themselves are not multi-thread safe (MT safe) and cannot be made into a DOE application (all DOE applications are inherently multithreaded). The dbx engines access the services of the wrapper server through the helper process. The wrapper server 510 on the local host 520 sends a message to the wrapper server on the remote host 522 requesting that a dbx engine be created on the remote host 522 and be instructed to attach to the server 516. The request by the dbx engine 504 on the local host 520 to create the dbx engine on the remote host 522 does not complete until the dbx engine 512 on the remote host 522 is fully started. The wrapper server on the remote host 522 forks and exec's the new dbx engine 512 on the remote host 522 and then waits for the dbx engine 512 to either terminate or send it (wrapper server 518 ) a message that indicates that the dbx engine 512 is fully started. The wrapper server 518 on the remote host 522 creates two threads. One thread waits for the forked child (dbx engine 512) to terminate. The other thread waits for a message from the dbx engine 512 that it is fully started. When one of those threads resumes, it destroys the other thread and sends the appropriate reply back to the wrapper server 510 on the local host 520 which in turn completes the request for the creation of the dbx engine 512 on the remote host 522 and returns the appropriate status value (creation succeeded or failed) to dbx engine 504 on the local host.

After the new dbx-engine 512 on the server has started (as described above), the dbx-engine 504 on the client sends a message to the new dbx-engine 512 to set the appropriate breakpoint in the server 516. The dbx-engine 504 on the client cannot send the breakpoint message to the dbx-engine 512 on the server until that dbx-engine 512 has been full started (i.e., it has gone through its initialization including connection to the debugger-gui and has attached to the server).

Some additional details about the functioning of the doeDebugger which are necessary to avoid possible race conditions are now provided.

The description of the steps performed during a "dstep" refers to sending a command to the dbx-engine attached to the server to set a breakpoint in the server. The command contains sufficient information to set the breakpoint on the correct thread in the server. When the step enters the trigger function, the information does not yet exist which can uniquely identify the thread in the server that will service the call resulting from the call of the trigger function. The actual mechanism is that an event is set in the transport layers at a point where an identifier for the request (the request id) resulting from the call of the trigger function is available. That event sends a command to the dbx-engine on the server. The message contains the request id, host name of the client, and interprocess address of the client and that uniquely identifies the request. The message sent to the dbx engine on the remote host results in a breakpoint set set in the message passing layer in the server. That breakpoint checks for a match of request id, host name of client, and client interprocess address and when a match is found, the thread that makes the match will be the thread that services the request that originated with the trigger function in the client. A breakpoint is then set for that thread on entry to the function and the server is then continued.

If the trigger function in the client is "foo" then the function in the server where the breakpoint is set is also "foo". However, class information is not available in the server so the "stop in member foo" command is used with a check for a specific thread. In some instances there will be a function "foo" in the automatically generated IDL code and the execution of the generated code will cause the breakpoint to fire. When the breakpoint fires a check is made to determine if we are in the IDL generated code. If it is, another breakpoint is set and execution is continued.

If the trigger function in the client is "foo", when the breakpoint in the server fires in "foo", the return trigger stack pointer is saved. The return trigger is used to continue education when a "dstep" is executed at the end of "foo". The user can also explicitly continue out of the server with a "cont" command. In either case, the saved return trigger stack pointer must be discarded so that it is not used on another call to the server. An event is set in the transport layer at a point that is guaranteed to execute on a return and the saved return trigger is discarded at that event. The event is filtered on thread so that only the return of the correct request will cause the return trigger to be discarded.

As described above with reference to FIG. 14, a message is sent from the dbx engine 504 on the local host 520 to the dbx engine 512 on the remote host 522 to set a breakpoint in the server 516. After that breakpoint message is sent, the client 508 is continued so that the remote invocation proceeds from the client 508 to the server 516. There is however, no guarantee that the breakpoint message is received and processed by the dbx engine 512 on the remote host 522 before the remote invocation reaches the server 516. To guarantee that the breakpoint is actually set before the remote invocation takes place, the dbx engine 504 on the local host 520 stops and waits for a message from the dbx engine 512 on the remote host 522. Once the dbx engine 512 on the remote host 522 sets the breakpoint in the server 516, it sends a message to the dbx engine 504 on the local host 520 to continue the client 508.

The additional changes/extensions which were identified above are now described.

The changes necessary to permit one dbx engine to communicate to another dbx engine included changes to both the debugger-GUI and dbx engine such that a specific ToolTalk message (referred to as the "rcmd" message) could be passed from the dbx engine to the debugger-GUI for the purposes of having a message sent to another dbx engine (referred to as the target dbx engine). The debugger-GUI accepts commands from the user and forwards them to specific dbx engines. The "rcmd" message contains the name of a host machine where the target dbx engine is running, the process identifier (pid) of the process being debugged by the target dbx engine and the message for the target dbx engine. The debugger-GUI maintains a list of dbx engines and this list contains the name of the host where the dbx engine is running and the pid of the process being debugged. When the debugger-GUI gets the "rcmd" messages, it searches its list of dbx engines for a dbx engine that is running on the named host machine and is debugging a process with the given pid. The message for the target dbx engine is then delivered to that dbx engine.

The changes necessary to permit the debugger-GUI to focus on a particular dbx engine included changes to both the debugger-GUI and dbx engine such that a specific ToolTalk message (referred to as the "attention" message) could be passed from the dbx engine to the debugger-GUI for the purposes of having the debugger-GUI change the focus of its attention to the sending dbx engine. The debugger-GUI maintains displays that relate to a specific dbx engine. For example, the source program for the process being debugged by a particular dbx engine is displayed by the debugger-GUI. The debugger-GUI has one set of displays and can show the information from one dbx engine at a time. The "attention" message tells the debugger-GUI to change its displays from the information for the current dbx engine to the information of the dbx engine sending the "attention" message.

The changes necessary to permit one to get a list of all active dbx engines from the debugger-GUI included changes to both the debugger-GUI and dbx engine such that a specific ToolTalk message (referred to as the "get dbx engines" message) could be passed from the dbx engine to the debugger-GUI for the purposes of having the debugger-GUI send back a list of the host names where each dbx engine was running and process identifier (pid) of the process being debugged by that dbx engine. The debugger-GUI maintains a list of all dbx engines which includes the name of the host where the dbx engine was running and the pid of the process being debugged by that dbx engine. When the debugger-GUI receives the "get dbx engine message", it extracts the name of the host and the pid of the process being debugged for each dbx engine and sends that back to the dbx engine sending the get dbx engines message.

IV. THE DISTRIBUTED DEBUGGER—HOW TO USE IT

Having described the changes/extensions to the SPARCworks debugger system necessary to create the doeDebugger of the present invention, the method of using the doeDebugger is now described.

Figure 10:
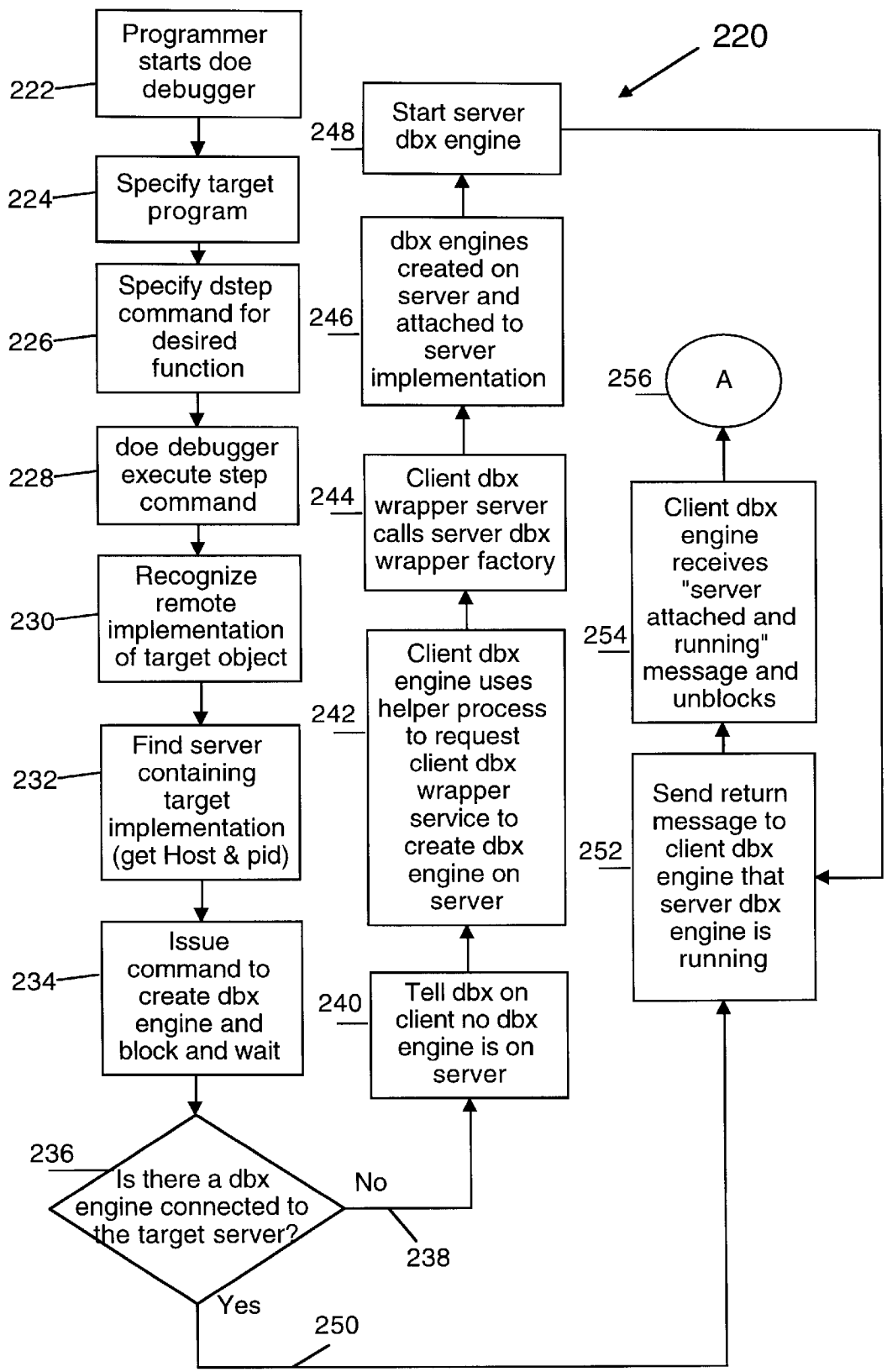
FIG. 10 illustrates a flow chart depicting the operation of the doeDebugger in a distributed environment.

Referring now to FIG. 10, the doeDebugger operation 220 is described. To begin, a programmer/developer on a local machine starts doeDebugger 222. The target program is indicated 224 and a "dstep" command is specified for a desired function 226. The doeDebugger executes a standard "step" command 228 and the doeDebugger attempts to determine if the target implementation is local or remote 230. Recognizing that the target is remote (by recognizing the "remote surrogate code" generated by the IDL), the "find server" function is executed 232 to find the host id and pid of the target implementation. The local dbx engine then issues a command to create a dbx engine in the found host 234 and blocks and waits for a response. The found host determines if there is a dbx engine connected to the target implementation 236. If there is already a dbx engine running 250 the server on the found host sends a return message to the calling client side dbx engine that a dbx engine is running. 252 The client side dbx engine receives the message and unblocks 254. The client side dbx engine then sends a message to the dbx engine on the server to set a temporary breakpoint in the designated function, 262 (in Figure 11). Continuing in FIG. 11, the server dbx engine executes the command to set breakpoint in the target function 264 and saves the return trigger stack pointer 266. The server dbx engine "continues" the target implementation 268. Subsequently the target implementation hits the designated breakpoint 270 and the server dbx engine services the breakpoint and sends a message to the debugger-GUI on the client host to focus on the server dbx engine 272. The programmer using the debugger-GUI is now able to debug the remote function as if it were on the client host 274. Thereafter the system checks to see if the debug session is finished (i.e. quit command received) 276 and if not 278 the debug session continues 282. If the quit command was received 280 the remote dbx engine quits and detaches from the target process 284 and exits the session 286.

Returning now to block 236 in FIG. 10, if there is no dbx engine running in the found server host 238, the server tells the dbx engine on the client host that no dbx engine is running 240. The client dbx engine using the helper object processes a request to the client side dbxWrapperFactory to create a dbx engine on the server on the found host 242. The client side dbxWrapperFactory object calls the server side dbxWrapperFactory implementation 244 and a dbx engine is created on the server of the found host and attaches itself to the target function implementation 246. This dbx engine which was just created and attached to the target function is started running 248 and a return message is sent to the client side dbx engine 252 and the process continues from this point as described above with reference to block 254 and the blocks on FIG. 11.

Figure 12:
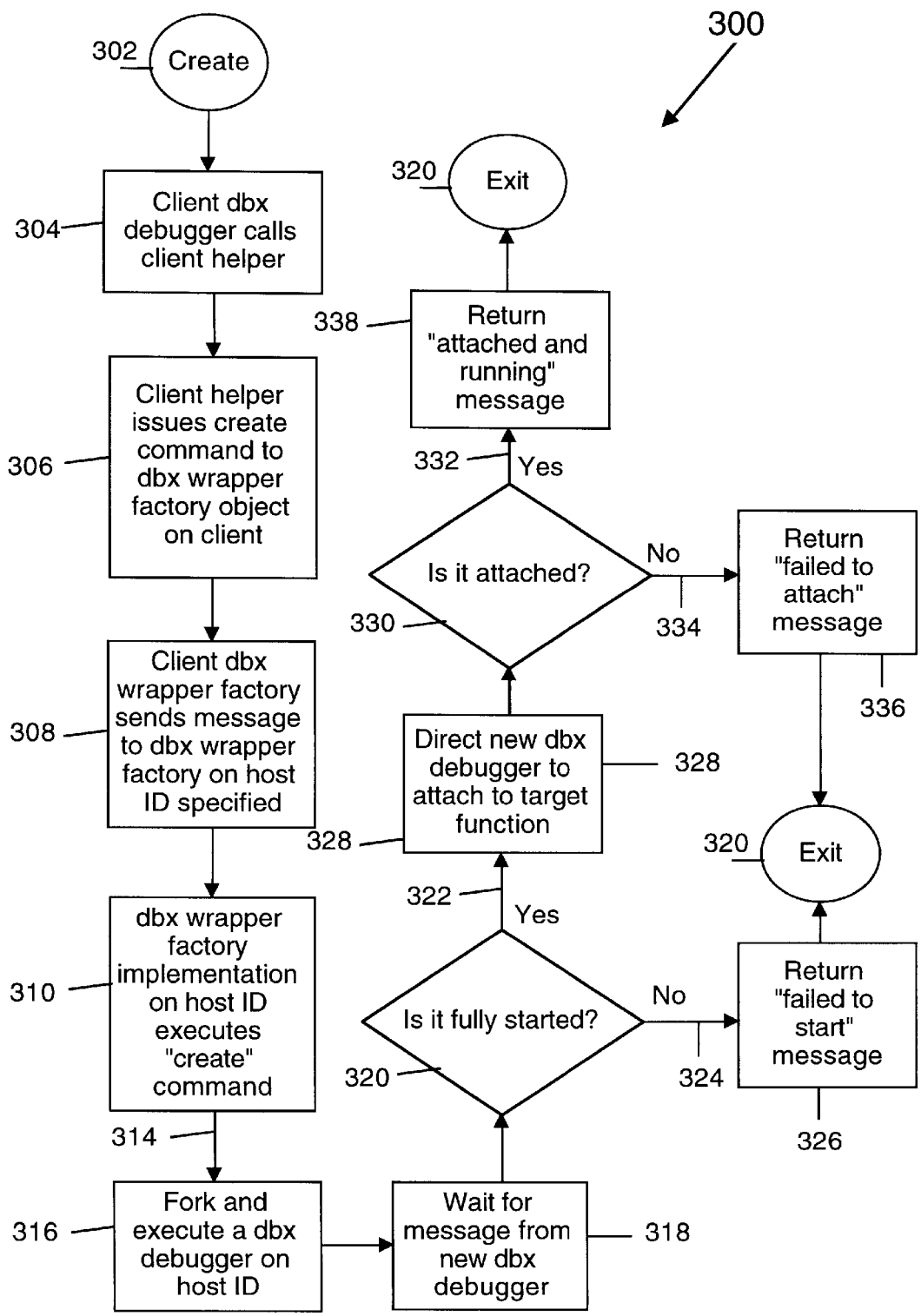
FIG. 12 illustrates a flow chart depicting the operation of the doeDebugger create and attach process (block 246 in the FIG. 10 chart).

The "Remote dbx engine Create and attach" process depicted in block 246 of FIG. 10 is now described in more detail with reference to FIG. 12. In FIG. 12, the "create" process 302 is initiated and the client side dbx engine calls the local helper process 304. The local helper process issues a "create" command to the dbxWrapperFactory object 306. The dbxWrapperFactory object sends a message to the dbxWrapperFactory implementation on the found host 308 which executes the "create" command 310. The dbxWrapperFactory implementation does a "fork" and "exec" for a dbx engine 316 and waits for a message from the newly created dbx engine 318. If the new dbx engine does not get fully started for some reason 324 a "Failed_to$_{13}$ start" message is returned 326 and the dbxWrapperFactory implementation exits 320. If the new dbx engine does get fully started 322 the new dbx engine is directed to attach to the target function 328. If the new dbx engine is not able to attach 334 a message "Failed_to_attach" is returned 336 and the dbxWrapperFactory implementation exits 320. If the new dbx engine is able to attach 332 a message "Attached_ and_running" is returned and the dbxWrapperFactory implementation exits 320. It should be noted that "failure to attach" to the target server may result from a server which has its own permission to attach requirements, in which case other mechanisms for attaching may be required.

Figure 11:
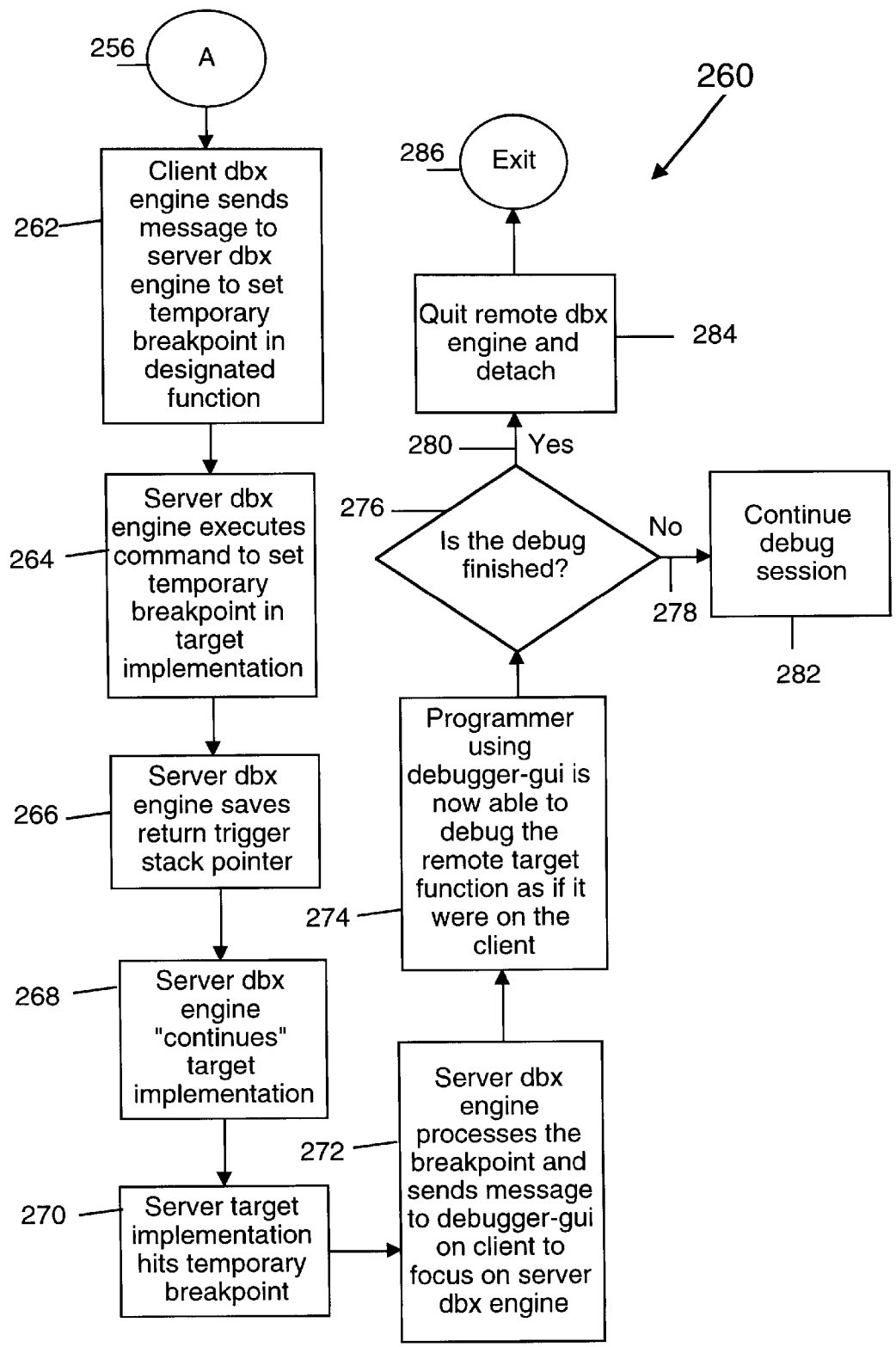
FIG. 11 illustrates a flow chart depicting the inter-dbx engine process.
Figure 13:
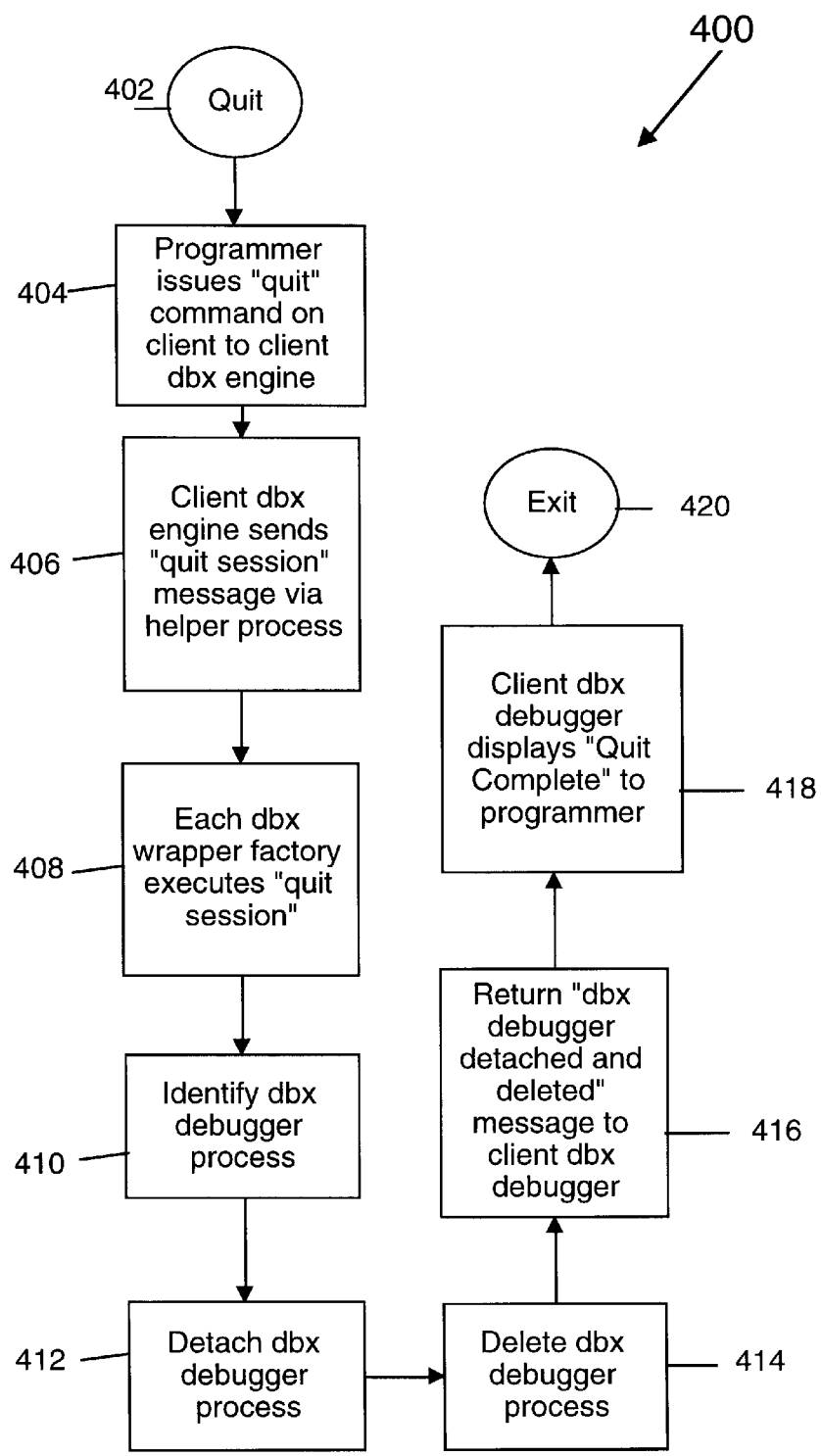
FIG. 13 illustrates a flow chart depicting the operation of the doeDebugger quit and detach process (block 284 in the FIG. 11 chart).

The "Remote dbx engine Quit and Detach" process depicted in block 284 of FIG. 11 is now described in more detail with reference to FIG. 13. In FIG. 13, the "Quit" process begins 402 with the programmer/developer issuing a "Quit" command to the debugger-GUI which passes the command to the local dbx engine 404. The local dbx engine sends a "QuitSession" message via the helper process to the dbxWrapperFactory to quit the debugging session 406. The "QuitSession" command causes the dbxWrapperFactory objects on each of the participating hosts to send a signal 408 to each dbx engine that is part of the debugging session. 410 Each dbx engine has a signal handler for the sent signal which checks to see if the signal is being sent from the dbxWrapperFactory and if it is, the dbx engine detaches from the process it is debugging 412 and quits. Alternative embodiments could include additional steps such as, detaching the dbx engine process from its target function 414, and returning a message like "dbx_debugger_detached_and_ deleted" to the client side dbx engine 416.

An interface for implementing a dbxWrapper is shown in FIG. 15. Those skilled in the art will recognize that various implementations may be made for this function.

Although the present invention has been described with reference to particular operating systems, program code mechanisms, and object and object reference definitions, it will be appreciated by one skilled in the art that the present invention may be implemented in any one of a number of variations within a given operating environment, or in different operating system or object system environments. Similarly, particular client and server configurations or combinations illustrated in the figures are only representative of one of many such configurations of clients and servers and object and sub-object relationships which may use the present invention. Moreover, it will be understood that the figures are for illustration only and should not be taken as limitations on the invention. Some additional combinations of the remote dbx engine with a client side debugger-GUI with other functions include the combining of the dbx engine with a Graphical User Interface ("GUI") agent that provides a friendly user interface to the target object; the combining of the remote dbx engine with an artificial intelligence agent which modifies remote requests based upon the user's known preferences; the combining of the remote dbx engine with a caching program that caches answers to remote requests; the combining of the remote dbx engine with a teleconferencing application that merges the inputs from several users and sends them to the target; or the combining of a remote dbx engine with a number of audio and video accessing agents in a multimedia system. These possible dbx engine and debugger-GUI combinations are not intended to limit in any way the possible uses of the remote debugger functionality as disclosed herein, but merely represent some examples which those skilled in these arts will recognize as exemplary. The scope of the doeDebugger invention should, therefore, be determined with reference to the appended claims, along with the full scope of equivalents to which the claims are entitled.

What is claimed is:

1. A distributed debugger system for debugging a distributed target application system which resides on a local host computer and one or more remote host computers, the distributed debugger system comprising:

a debugger-GUI and one or more debugger engines (hereinafter termed "dbx engines"), said debugger-GUI providing an interface mechanism for communicating with said dbx engines, and for communicating with a user of said debugger system, wherein said dbx engines may reside on said local and remote host computers;

a communications mechanism for use by said dbx engines and said debugger-GUI in sending messages to and receiving messages from each other; and a remote dbx engine which is one of said one or more dbx engines and which is residing on a host computer remote from said local host computer, said remote dbx engine having capabilities equivalent to those of a SPARCworks dbx engine, said remote dbx engine connected to said debugger-GUI by means of said communication mechanism, said remote dbx engine co-operating with said debugger-GUI while ignoring any intermediate Interface Definition Language ("IDL") generated code mechanisms which connect local and remote sections of said target application system but which are not part of said target application system itself, thereby permitting said user to debug said distributed target application system with an illusion that the user is debugging a single process application, said remote dbx engine having a remote surrogate code test mechanism for determining which intermediate IDL generated code mechanisms which connect local and remote sections of said target application should be ignored.

2. The distributed debugger system for debugging a distributed target application system of claim 1 further comprising a second communications mechanism to permit said debugger-GUI to focus on one of said dbx engines regardless of which host computer said dbx engine is on.

3. The distributed debugger system for debugging a distributed target application system of claim 1 further comprising a third communications mechanism to permit said user to obtain from said debugger-GUI a list of all active dbx engines regardless of which host computer said dbx engines are on.

4. The distributed debugger system of claim 1 wherein the remote dbx engine further comprises a remote breakpoint setting mechanism thereby permitting a user on said local host computer to set a breakpoint in a function of the distributed target application system which is actually implemented in said remote host computer.

5. The distributed debugger system of claim 1 wherein the remote dbx engine further comprises a GetImplementation mechanism for locating a host ID and process ID (PID) of a server for any designated object.

6. The distributed debugger system of claim 1 wherein the remote dbx engine further comprises an IdentifyRemoteFunction mechanism for identifying whether a remote dbx engine is running and if not for creating and attaching a dbx engine to a remote target function by using the facilities of a dbxWrapperFactory object.

7. The distributed debugger system of claim 1 wherein the remote dbx engine further comprises a multiple dbx engine synchronizer mechanism for permitting dbx engines to communicate with each other.

8. A computer implemented method for producing a distributed debugger system for debugging a distributed target application system which target application system resides on a local host computer and one or more remote host computers, the computer implemented method comprising the steps of:

providing in a local host computer a debugger-GUI and one or more debugger engines (hereinafter termed "dbx engines"), said debugger-GUI providing an interface mechanism for communicating with said dbx engines, and for communicating with a user of said debugger system;

providing a communication mechanism for use by said dbx engines and said debugger-GUI in sending messages to and receiving messages from each other; and providing a remote dbx engine which is one of said one or more dbx engines and which is residing on a host computer remote from said local host computer, said remote dbx having capabilities equivalent to those of a SPARCworks dbx engine, said remote dbx engine connected to said debugger-GUI by means of said communication mechanism, said remote dbx engine being able, under direction from said debugger-GUI, to attach itself to a section of said distributed target application system which is residing on said remote host computer for purposes of debugging said section of said distributed target application system which is residing on said remote host computer, said remote dbx engine co-operating with said debugger-GUI while ignoring any intermediate Interface Definition Language ("IDL") generated code mechanisms which connect local and remote sections of said target application system but which are not part of said target application system itself, thereby permitting said user to debug said distributed target application system with an illusion that the user is debugging a single process application, said remote dbx engine having a remote surrogate code test mechanism for determining which intermediate IDL generated code mechanisms which connect local and remote sections of said distributed target application should be ignored.

9. A computer implemented method for producing a distributed debugger system for debugging a distributed target application system which resides on a local host computer and one or more remote host computers, the computer implemented method comprising the steps of:

providing a debugger-GUI and one or more debugger engines (hereinafter termed "dbx engines"), said debugger-GUI providing an interface mechanism for communicating with said dbx engines, wherein said dbx engines may reside on said local and remote host computers, and for communicating with a user of said debugger system;

providing a communications mechanism for use by said dbx engines and said debugger-GUI in sending messages to and receiving messages from each other; and providing a dbxWrapperFactory mechanism for use by said debugger-GUI to create a new dbx engine in a remote host computer for use in debugging a part of said target application system which resides on said remote host computer, said new dbx engine having capabilities equivalent to those of a SPARCworks dbx engine, said new dbx engine in said remote host computer co-operating with said debugger-GUI and said one or more dbx engines residing on said local host computer to debug said target application system while ignoring any intermediate Interface Definition Language ("IDL") generated code mechanisms which connect local and remote sections of said target application system but which are not part of said target application system itself, thereby permitting said user to debug said distributed target application system with an illusion that the user is debugging a single process application.

10. The computer implemented method for producing a distributed debugger system for debugging a distributed target application system of claim 9 wherein said new dbx engine is connected to said debugger-GUI by means of said communications mechanism.

11. A computer implemented method for producing a distributed debugger system for debugging a distributed target application system which resides on a local host computer and one or more remote host computers, the computer implemented method comprising the steps of:

providing a debugger-GUI and one or more debugger engines (hereinafter termed "dbx engines"), said debugger-GUI providing an interface mechanism for communicating with said dbx engines, wherein said dbx engines may reside on said local and remote host computers, and for communicating with a user of said debugger system;

providing a communications mechanism for use by said dbx engines and said debugger-GUI in sending messages to and receiving messages from each other;

providing a dbxWrapperFactory mechanism for use by said debugger-GUI to create a new dbx engine in a remote host computer for use in debugging a part of said target application system which resides on said remote host computer, said new dbx engine having capabilities equivalent to those of a SPARCworks dbx engine;

providing a dstep mechanism for instructing said dbx engines to ignore (that is, "step over") any of said intermediate Interface Definition Language ("IDL") generated code mechanisms which connect local and remote sections of said target application system but which are not part of said target application system itself; and providing said new dbx engine a remote surrogate code test mechanism for determining which intermediate IDL generated code mechanisms which connect local and remote sections of said target application system should be ignored.

12. The computer implemented method for producing a distributed debugger system for debugging a distributed target application system of claim 9 further comprising a step of providing a first communications mechanism to permit one of said dbx engines to communicate with another of said dbx engines regardless of whether these dbx engines are on different host computers.

13. The computer implemented method for producing a distributed debugger system for debugging a distributed target application system of claim 9 further comprising a step of providing a second communications mechanism to permit said debugger-GUI to focus on one of said dbx engines regardless of which host computer said dbx engine is on.

14. The computer implemented method for producing a distributed debugger system for debugging a distributed target application system of claim 9 further comprising a step of providing a third communications mechanism to permit said user to obtain from said debugger-GUI a list of all active dbx engines regardless of which host computer said dbx engines are on.

15. A computer implemented method as recited in claim 8 further comprising the step of providing a second communications mechanism to permit said debugger-GUI to focus on one of said dbx engines regardless of which host computer said dbx engine is on.

16. A computer implemented method as recited in claim 8 further comprising the step of providing a second communications mechanism to permit said user to obtain from said debugger-GUI a list of all active dbx engines regardless of which host computer said dbx engines are on.

17. A computer implemented method as recited in claim 16 further comprising the step of providing a third communications mechanism to permit said debugger-GUI to focus on one of said dbx engines regardless of which host computer said dbx engine is on.

18. A computer implemented method as recited in claim 8 wherein the remote dbx further includes a remote breakpoint setting mechanism thereby permitting a user on said local host computer to set a breakpoint in a function of the distributed target application system which is actually implemented in said remote host computer.

19. A computer implemented method as recited in claim 8 wherein the remote dbx further includes a GetImplementation mechanism for locating a host ID and process ID (PID) of a server for any designated object.

20. A computer implemented method as recited in claim 8 wherein the remote dbx further includes an IdentifyRemoteFunction mechanism for identifying whether a remote dbx engine is running and if not for creating and attaching a dbx engine to a remote target function by using the facilities of a dbxWrapperFactory object.

21. A computer implemented method as recited in claim 8 wherein the remote dbx further includes a multiple dbx engine synchronizer mechanism for permitting dbx engines to communicate with each other.

* * * * *